(12) United States Patent
Gordon et al.

(10) Patent No.: US 9,721,397 B2
(45) Date of Patent: Aug. 1, 2017

(54) AUTOMATIC TOLL BOOTH INTERACTION WITH SELF-DRIVING VEHICLES

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 14/823,221

(22) Filed: Aug. 11, 2015

(65) Prior Publication Data
US 2017/0046883 A1    Feb. 16, 2017

(51) Int. Cl.
*G07B 15/06* (2011.01)
*G06Q 30/02* (2012.01)
(Continued)

(52) U.S. Cl.
CPC ........... *G07B 15/06* (2013.01); *G05D 1/0088* (2013.01); *G06Q 30/0283* (2013.01); *G06Q 50/30* (2013.01)

(58) Field of Classification Search
CPC ...... G07B 15/063; G07B 15/06; G07B 15/00; G06K 9/00785; G08G 1/01; G08G 1/0133;
(Continued)

(56) References Cited

U.S. PATENT DOCUMENTS

| 4,908,988 A | 3/1990 | Yamamura et al. |
| 5,975,791 A | 11/1999 | McCulloch |

(Continued)

FOREIGN PATENT DOCUMENTS

| CN | 1135063 | 11/1996 |
| CN | 2349068 Y | 11/1999 |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Dalena Tran
(74) *Attorney, Agent, or Firm* — Law Office of Jim Boice

(57) ABSTRACT

A computer-implemented method, system, and/or computer program product enables automatic toll booth interaction with self-driving vehicles (SDVs). An SDV interrogation transceiver at a toll booth interrogates a driving mode module on an SDV. The SDV is capable of being operated in autonomous mode by an on-board SDV control processor. The driving mode module selectively controls the SDV to be operated in the autonomous mode or in manual mode, in which a human driver of the SDV manually operates the SDV. The SDV interrogation transceiver receives a driving mode descriptor of the SDV, which identifies whether the SDV currently is operating in the autonomous mode or in the manual mode while traveling on a toll road. An adjusted toll charge for the SDV to travel on the toll road is then transmitted based on the driving mode descriptor.

17 Claims, 7 Drawing Sheets

(51) Int. Cl.
*G06Q 50/30* (2012.01)
*G05D 1/00* (2006.01)

(58) Field of Classification Search
CPC ........ G08G 1/017; G08G 1/093; G08G 1/207;
G08G 1/096725; B61B 3/02; G06Q
30/0207; G06Q 30/0246; G06Q 30/0224
USPC ..... 705/13, 400, 14.1, 14.11; 701/117, 29.3,
701/29.6, 32.3, 23; 340/928, 540, 933
See application file for complete search history.

(56) References Cited

U.S. PATENT DOCUMENTS

| | | | |
|---|---|---|---|
| 6,064,970 | A | 5/2000 | McMillan et al. |
| 6,201,318 | B1 | 3/2001 | Guillory |
| 6,326,903 | B1 | 12/2001 | Gross et al. |
| 6,393,362 | B1 | 5/2002 | Burns |
| 6,502,035 | B2 | 12/2002 | Levine |
| 6,587,043 | B1 | 7/2003 | Kramer |
| 6,622,082 | B1 | 9/2003 | Schmidt et al. |
| 6,731,202 | B1 | 5/2004 | Klaus |
| 6,810,312 | B2 | 10/2004 | Jammu et al. |
| 7,124,088 | B2 | 10/2006 | Bauer et al. |
| 7,580,782 | B2 | 8/2009 | Breed et al. |
| 7,769,544 | B2 | 8/2010 | Blesener et al. |
| 7,877,269 | B2 | 1/2011 | Bauer et al. |
| 7,894,951 | B2 | 2/2011 | Norris et al. |
| 7,979,173 | B2 | 7/2011 | Breed |
| 8,031,062 | B2 | 10/2011 | Smith |
| 8,045,455 | B1 | 10/2011 | Agronow et al. |
| 8,078,349 | B1* | 12/2011 | Prada Gomez ...... G05D 1/0061 701/1 |
| 8,090,598 | B2 | 1/2012 | Bauer et al. |
| 8,139,109 | B2 | 3/2012 | Schmiedel et al. |
| 8,140,358 | B1 | 3/2012 | Ling et al. |
| 8,146,703 | B2 | 4/2012 | Baumann et al. |
| 8,152,325 | B2 | 4/2012 | McDermott |
| 8,190,322 | B2 | 5/2012 | Lin et al. |
| 8,346,480 | B2 | 1/2013 | Trepagnier et al. |
| 8,352,112 | B2 | 1/2013 | Mudalige |
| 8,442,854 | B2 | 5/2013 | Lawton et al. |
| 8,466,807 | B2 | 6/2013 | Mudalige |
| 8,489,434 | B1 | 7/2013 | Otis et al. |
| 8,509,982 | B2 | 8/2013 | Montemerlo et al. |
| 8,583,365 | B2 | 11/2013 | Jang et al. |
| 8,660,734 | B2 | 2/2014 | Zhu et al. |
| 8,676,466 | B2 | 3/2014 | Mudalige |
| 8,786,461 | B1 | 7/2014 | Daudelin |
| 8,793,046 | B2 | 7/2014 | Lombrozo et al. |
| 8,816,857 | B2 | 8/2014 | Nordin et al. |
| 8,874,305 | B2 | 10/2014 | Dolgov et al. |
| 8,880,270 | B1 | 11/2014 | Ferguson et al. |
| 8,903,591 | B1 | 12/2014 | Ferguson et al. |
| 8,924,150 | B2 | 12/2014 | Tsimhoni et al. |
| 8,948,955 | B2 | 2/2015 | Zhu et al. |
| 8,949,016 | B1 | 2/2015 | Ferguson et al. |
| 8,954,217 | B1 | 2/2015 | Montemerlo et al. |
| 8,954,252 | B1 | 2/2015 | Urmson et al. |
| 8,954,261 | B2 | 2/2015 | Das et al. |
| 8,958,943 | B2 | 2/2015 | Bertosa et al. |
| 8,965,621 | B1 | 2/2015 | Urmson et al. |
| 8,970,362 | B2 | 3/2015 | Morley et al. |
| 8,983,705 | B2 | 3/2015 | Zhu et al. |
| 8,996,224 | B1 | 3/2015 | Herbach et al. |
| 9,014,905 | B1 | 4/2015 | Kretzschmar et al. |
| 9,020,697 | B2 | 4/2015 | Ricci et al. |
| 9,024,787 | B2 | 5/2015 | Alshinnawi et al. |
| 9,082,239 | B2 | 7/2015 | Ricci |
| 9,123,049 | B2* | 9/2015 | Hyde ................. G06Q 30/02 |
| 9,170,327 | B2 | 10/2015 | Choe et al. |
| 9,189,897 | B1 | 11/2015 | Stenneth |
| 9,194,168 | B1 | 11/2015 | Lu et al. |
| 9,216,745 | B2 | 12/2015 | Beardsley et al. |
| 9,286,520 | B1 | 3/2016 | Lo et al. |
| 9,305,411 | B2 | 4/2016 | Ricci |
| 9,317,033 | B2 | 4/2016 | Ibanez-guzman et al. |
| 9,390,451 | B1* | 7/2016 | Slusar .................... G06Q 40/04 |
| 9,399,472 | B2 | 7/2016 | Minoiu-Enache |
| 9,463,805 | B2 | 10/2016 | Kirsch et al. |
| 9,483,948 | B1 | 11/2016 | Gordon et al. |
| 2002/0026841 | A1 | 3/2002 | Svendsen |
| 2003/0065572 | A1 | 4/2003 | McNee et al. |
| 2003/0076981 | A1 | 4/2003 | Smith et al. |
| 2004/0078133 | A1 | 4/2004 | Miller |
| 2004/0199306 | A1 | 10/2004 | Heilmann et al. |
| 2005/0104745 | A1 | 5/2005 | Bachelder et al. |
| 2006/0106671 | A1 | 5/2006 | Biet |
| 2006/0163939 | A1 | 7/2006 | Kuramochi et al. |
| 2006/0200379 | A1 | 9/2006 | Biet |
| 2006/0241855 | A1 | 10/2006 | Joe et al. |
| 2007/0100687 | A1 | 5/2007 | Yoshikawa |
| 2007/0124027 | A1 | 5/2007 | Betzitza et al. |
| 2008/0048850 | A1 | 2/2008 | Yamada |
| 2008/0114663 | A1 | 5/2008 | Watkins et al. |
| 2008/0129475 | A1 | 6/2008 | Breed et al. |
| 2008/0201217 | A1 | 8/2008 | Bader et al. |
| 2009/0094109 | A1 | 4/2009 | Aaronson et al. |
| 2009/0248231 | A1 | 10/2009 | Kamiya |
| 2009/0313096 | A1* | 12/2009 | Kaga .................... G07B 15/063 705/13 |
| 2010/0057511 | A1 | 3/2010 | Mansouri et al. |
| 2010/0156672 | A1 | 6/2010 | Yoo et al. |
| 2010/0179720 | A1 | 7/2010 | Lin et al. |
| 2010/0228427 | A1 | 9/2010 | Anderson et al. |
| 2010/0256852 | A1 | 10/2010 | Mudalige |
| 2011/0035250 | A1 | 2/2011 | Finucan |
| 2011/0077807 | A1 | 3/2011 | Hyde et al. |
| 2011/0137699 | A1 | 6/2011 | Ben-Ari et al. |
| 2011/0264521 | A1 | 10/2011 | Straka |
| 2012/0277947 | A1 | 11/2012 | Boehringer et al. |
| 2013/0030657 | A1 | 1/2013 | Chatterjee et al. |
| 2013/0113634 | A1 | 5/2013 | Hutchinson et al. |
| 2013/0131949 | A1 | 5/2013 | Shida |
| 2013/0144502 | A1 | 6/2013 | Shida |
| 2013/0231824 | A1 | 9/2013 | Wilson et al. |
| 2013/0261871 | A1 | 10/2013 | Hobbs et al. |
| 2014/0019259 | A1 | 1/2014 | Dung et al. |
| 2014/0092332 | A1 | 4/2014 | Price |
| 2014/0095214 | A1 | 4/2014 | Mathe et al. |
| 2014/0129073 | A1 | 5/2014 | Ferguson |
| 2014/0136045 | A1 | 5/2014 | Zhu et al. |
| 2014/0136414 | A1 | 5/2014 | Abhyanker |
| 2014/0164126 | A1 | 6/2014 | Nicholas et al. |
| 2014/0188999 | A1 | 7/2014 | Leonard et al. |
| 2014/0195213 | A1 | 7/2014 | Kozloski |
| 2014/0201037 | A1 | 7/2014 | Mallawarachchi et al. |
| 2014/0201126 | A1 | 7/2014 | Zadeh |
| 2014/0214255 | A1 | 7/2014 | Dolgov et al. |
| 2014/0222277 | A1 | 8/2014 | Tsimhoni et al. |
| 2014/0222577 | A1 | 8/2014 | Abhyanker |
| 2014/0282967 | A1 | 9/2014 | Maguire |
| 2014/0297116 | A1 | 10/2014 | Anderson et al. |
| 2014/0306833 | A1 | 10/2014 | Ricci |
| 2014/0309789 | A1 | 10/2014 | Ricci |
| 2014/0309806 | A1 | 10/2014 | Ricci |
| 2014/0309864 | A1 | 10/2014 | Ricci |
| 2014/0309891 | A1 | 10/2014 | Ricci |
| 2014/0310186 | A1 | 10/2014 | Ricci |
| 2014/0316671 | A1 | 10/2014 | Okamoto |
| 2014/0324268 | A1 | 10/2014 | Montemerlo et al. |
| 2014/0330479 | A1 | 11/2014 | Dolgov |
| 2014/0358331 | A1 | 12/2014 | Prada Gomez et al. |
| 2014/0358353 | A1 | 12/2014 | Ibanez-Guzman et al. |
| 2015/0006005 | A1 | 1/2015 | Yu et al. |
| 2015/0006014 | A1 | 1/2015 | Wimmer et al. |
| 2015/0026092 | A1 | 1/2015 | Abboud et al. |
| 2015/0035685 | A1 | 2/2015 | Strickland et al. |
| 2015/0057891 | A1 | 2/2015 | Mudalige et al. |
| 2015/0062340 | A1* | 3/2015 | Datta .................. G06K 9/00838 348/148 |
| 2015/0062469 | A1 | 3/2015 | Fleury |
| 2015/0066282 | A1 | 3/2015 | Yopp |
| 2015/0066284 | A1 | 3/2015 | Yopp |
| 2015/0070178 | A1 | 3/2015 | Kline |

(56) References Cited

U.S. PATENT DOCUMENTS

| | | |
|---|---|---|
| 2015/0095190 A1 | 4/2015 | Hammad et al. |
| 2015/0134178 A1 | 5/2015 | Minoiu-Enache |
| 2015/0141043 A1 | 5/2015 | Abramson |
| 2015/0149021 A1 | 5/2015 | Duncan et al. |
| 2015/0160019 A1 | 6/2015 | Biswal et al. |
| 2015/0166059 A1 | 6/2015 | Ko |
| 2015/0175070 A1 | 6/2015 | Attard et al. |
| 2015/0178998 A1 | 6/2015 | Attard et al. |
| 2015/0196256 A1 | 7/2015 | Venkatraman et al. |
| 2015/0232065 A1 | 8/2015 | Ricci et al. |
| 2015/0293994 A1 | 10/2015 | Kelly |
| 2015/0338226 A1 | 11/2015 | Mason et al. |
| 2015/0339639 A1 | 11/2015 | Choe |
| 2016/0001781 A1 | 1/2016 | Fung et al. |
| 2016/0026182 A1 | 1/2016 | Boroditsky et al. |
| 2016/0075512 A1 | 3/2016 | Lert, Jr. |
| 2016/0078695 A1 | 3/2016 | McClintic et al. |
| 2016/0078758 A1 | 3/2016 | Basalamah |
| 2016/0139594 A1 | 5/2016 | Okumura et al. |
| 2016/0140507 A1 | 5/2016 | Stevens et al. |
| 2016/0176409 A1 | 6/2016 | Kirsch et al. |
| 2016/0303969 A1 | 10/2016 | Akula |
| 2016/0334797 A1 | 11/2016 | Ross et al. |
| 2016/0344737 A1 | 11/2016 | Anton |
| 2016/0355192 A1 | 12/2016 | James et al. |
| 2016/0364823 A1 | 12/2016 | Cao |

FOREIGN PATENT DOCUMENTS

| | | |
|---|---|---|
| CN | 201004265 Y | 1/2008 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 0582236 A1 | 2/1994 |
| WO | 2014058263 A1 | 4/2014 |
| WO | 2014066721 A2 | 5/2014 |
| WO | 2014147361 A1 | 9/2014 |
| WO | 2014148975 A1 | 9/2014 |
| WO | 2014148976 A1 | 9/2014 |
| WO | 2015024616 A1 | 2/2015 |
| WO | 2015056105 A1 | 4/2015 |
| WO | 2015156146 A1 | 10/2015 |

OTHER PUBLICATIONS

X. Jardin, "Terrifying dashcam video captures distracted teen drivers crashing while goofing off", Boing Boing, www.boingboing.net, Mar. 26, 2015, 1 page.

M. Fox, "Self-driving cars safer than those driven by humans: Bob Lutz", CNBC, www.cnbc.com, Sep. 8, 2014, 1 page.

U.S. Appl. No. 14/855,731 Non-Final Office Action Mailed Apr. 15, 2016.

U.S. Appl. No. 141887,388, filed Oct. 20, 2015.

A. Abkowitz, "Do Self-Driving Cars Spell Doom for Auto Insurers?", Bloomberg L.P., Sep. 10, 2014, pp. 1-2.

Anonymous, "Self-Driving Cars and Insurance", Insurance Information Institute, Inc., Feb. 2015, pp. 1-3.

Gomes, Lee. "Google's Self-Driving Cars Still Face Many Obstacles / MIT Technology Review.", MIT Technology Review. Aug. 28, 2014. Web. <http://www.technologyreview.co,/news/530276/hidden-obstabscles-for-googles-self-driving-cars/>.

Smith, Mark. "Inovations: Emerging Trends in the Wheelchair Market." New Mobility Magazine, Aug. 1, 2014. Web. <http://www.newmobility.com/2014/08/emerging-trends/>.

Crothers, Brooke. "Google Now Reporting Self-Driving Car Accidents: Her, It's Not the Car's Fault". forbes.com, Jun. 8, 2015. <http:/www.forbes.com/sites/brookecrothers/2015/06/08/google-now-reportibg-driverless-car-accidents/>.

Anonymous, 'System and Method to Target Advertisements for the Right Focus Group'. IP.com, No. 000218285, May 31, 2012, pp. 1-2.

Anonymous, "Car Built-In Mechanism to Enforce Mandatory Self-Driving Mode", IP.com, No. 000234916, Feb. 14, 2014, pp. 1-3.

T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.

J. Miller, "Self-Driving Car Technologu's Benefits, Potential Risks, and Solutions", The Energy Collective, theenergycollective.com, Aug. 19, 2014, pp. 1-7.

J. O'Callaghan, "Inside the Mercedes Self-Guidubg Car That's Built for Luxurious Living in, Not Driving", Associated Newspapers Ltd., Daily Mail, dailymail.com.UK, Jan. 6, 2015, pp. 1-13.

J. Wei et al, "Towards a Viable Autonomous Driving Research Platform", IEEE, Intelegent Vehicles Symposium (IV), 2013, pp. 1-8.

J. Farrier, "Airlines Infuse Their Planes With Smells to Calm You Down", Neatorama, neatorama.com, Mar. 29, 2015, 1 Page.

T. Vanderbilt, "Let the Robot Drive: The Autonomous Car of the Future is Here", Wired Magazine, Conde Nast, www.wired.com, Jan. 20, 2012. pp. 1-34.

Chen S, et al., A Crash Risk Assessment Model for ROAS Curves. Inproceedings 20th International Technical Conference on the Enhanced Saftey of Vehicles., 2007. Lyon, France.

E. Lehrer, "The Insurance Implications of Google's Self-Driving Car", Insurance Journal, Right Street Bloh=G, May 28, 2014, pp. 1-2.

Anonymous, "Diagnostics Mechanism for Self-Driving Cars to Validate Self-Driving Capabilities", IP.com, Jun. 6, 2014, pp. 1-5. IP.com.

Anonymous, "Diagnostics Mechanism for Self-Driving Cars to Validate Self-Driving Capabilities", IP.com, Jun. 6, 2014, pp. 1-5. IP.com Brownell, "Shared Autonomous Taxi Networks: An Analysis of Transportation Demand in NJ and a 21st Century Solution for Congestion", Dissertation, Princeton University, 2013, pp. 1-122.

Bessa et al., "Blueprint of Alternative City Cyber-Mobility Take-U Scenarios", Seventh Framework Programme Theme SST.12012.3. 1-4, Automated Urban Vehicles Collaborative Project—Grant Agreement No. 314190, 2013, pp. 1-63.

Lutinet al., "The Revolutionary Development of Self-Driving Vehicles and Implications for the Transportation Engineering Profession", ITE Journal 83.7, 2013, pp. 28-32.

A. Hars, "Self-Driving Cars: The Digital Transformation of Mobility", Marktplatze Im Umbruch, Springer Berlin Heidelberg, 2015, pp. 539-549.

Jimenez et al.; "Autonomous collision avoidance system based on accurate knowledge of the vehicle surroundings"; Inst Engineering Technology—IET; IET Intelligent Transport Systems vol. 9, No. 1, pp. 105-117; 2015; England.

Anonymous, "Avoiding Crashes With Self-Driving Cars: Today's Crash-Avoidance Systems Are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.

Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/google-files-patent-for-second-gen-autonomous-vehicle-without-a-steering-wheel-brake-pedal-more.html>.

C. Berger et al., "Cots-Architecture With a Real-Time OS for a Self-Driving Miniature Vehicle", Safecomp 2013—Workshop ASCOMS of the 32nd International Conference on Computer Safety, Reliability and Security, Sep. 2013, Toulouse, France, pp. 1-13.

\* cited by examiner

AUTOMATIC TOLL BOOTH INTERACTION WITH SELF-DRIVING VEHICLES

BACKGROUND

The present disclosure relates to the field of vehicles, and specifically to the field of self-driving vehicles. Still more specifically, the present disclosure relates to the field of self-driving vehicles passing through toll booths on toll roads.

Self-driving vehicles (SDVs) are vehicles that are able to autonomously drive themselves through private and/or public spaces. Using a system of sensors that detect the location and/or surroundings of the SDV, logic within or associated with the SDV controls the propulsion, stopping, and steering of the SDV based on the sensor-detected location and surroundings of the SDV.

SUMMARY

A computer-implemented method, system, and/or computer program product enables automatic toll booth interaction with self-driving vehicles (SDVs). An SDV interrogation transceiver at a toll booth interrogates a driving mode module on an SDV. The SDV is capable of being operated in autonomous mode by an on-board SDV control processor. The driving mode module selectively controls the SDV to be operated in the autonomous mode or in manual mode, in which a human driver of the SDV manually operates the SDV. The SDV interrogation transceiver receives a driving mode descriptor of the SDV, which identifies whether the SDV currently is operating in the autonomous mode or in the manual mode while traveling on a toll road. An adjusted toll charge for the SDV to travel on the toll road is then transmitted based on the driving mode descriptor.

DETAILED DESCRIPTION

Figure 1:
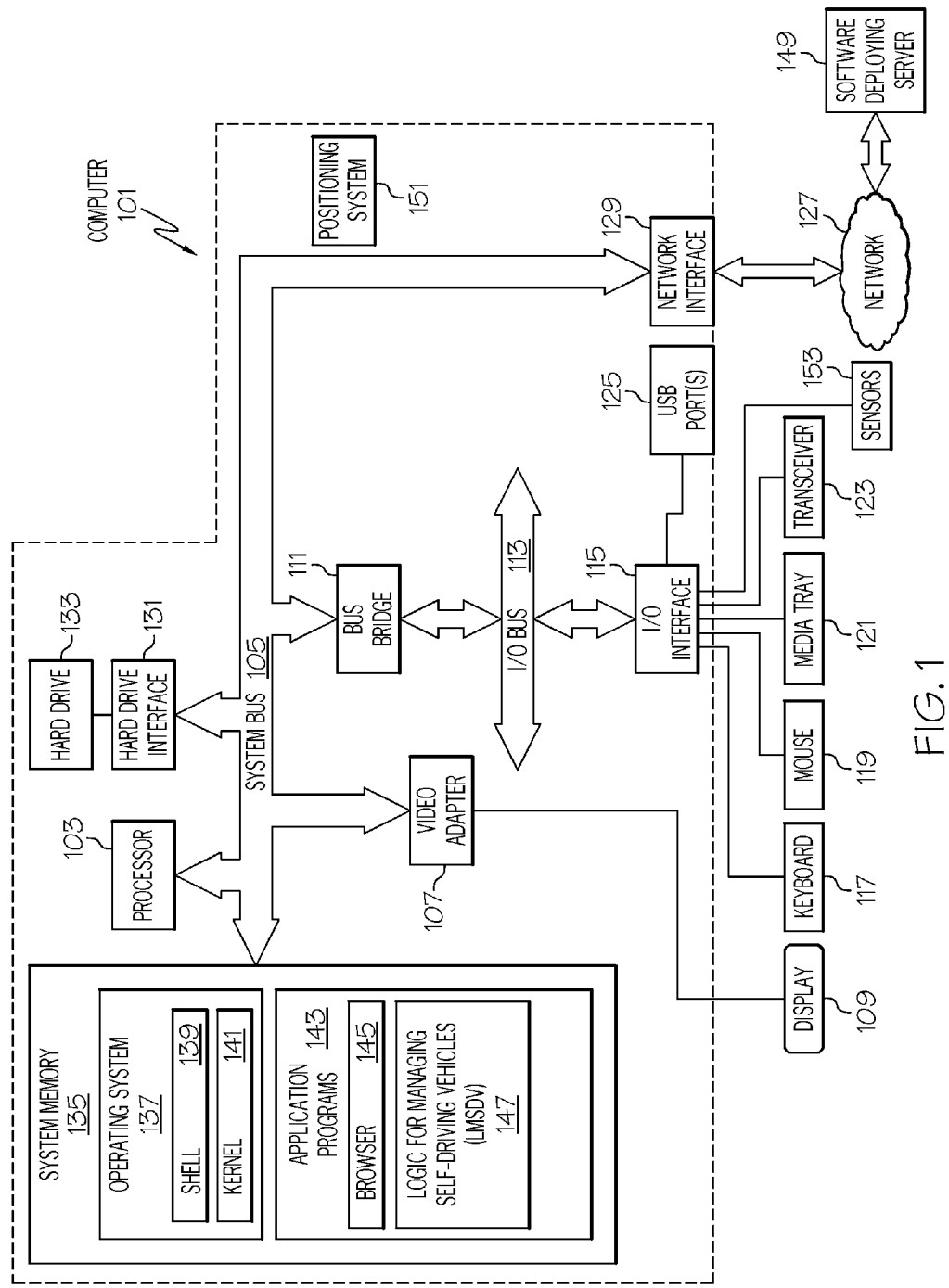
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or toll booth server 208 and/or toll road computer 210 depicted in FIG. 2, and/or self-driving vehicle (SDV) onboard computer 301 shown in FIG. 3, and/or coordinating server 401 depicted in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., coordinating server 401, SDV 202, toll booth server 208, toll road computer 210, etc.) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing Self-Driving Vehicles (LMSDV) 147. LMSDV 147 includes code for implementing the processes described below, including those described in FIGS. 2-5. In one embodiment, computer 101 is able to download LMSDV 147 from software deploying server 149, including in an on-demand basis, wherein the code in LMSDV 147 is not downloaded until needed for execution. In one embodiment of the present invention, software deploying server 149 performs all of the functions associated with the present invention (including execution of LMSDV 147), thus freeing computer 101 from having to use its own internal computing resources to execute LMSDV 147.

Also within computer 101 is a positioning system 151, which determines a real-time currently location of computer 101 (particularly when part of an emergency vehicle and/or a self-driving vehicle as described herein). Positioning system 151 may be a combination of accelerometers, speedometers, etc., or it may be a global positioning system (GPS) that utilizes space-based satellites to provide triangulated signals used to determine two or three dimensional locations.

Also associated with computer 101 are sensors 153, which detect an environment of the computer 101. More specifically, sensors 153 are able to detect vehicles, road obstructions, toll booths, etc. For example, if computer 101 is on board a self-driving vehicle (SDV), then sensors 153 may be cameras, radar transceivers, etc. that allow the SDV to detect the environment (e.g., other vehicles, road obstructions, a toll booth, etc.) of that SDV. Similarly, if computer 101 is part of the toll road computer 210 or the toll booth server 208 shown in FIG. 2, then sensors 153 may be cameras, radar transceivers, radio frequency identifier (RFID) transceivers, etc. that allow the toll road computer 210 and/or the toll booth server 208 to identify oncoming vehicles, including SDVs.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
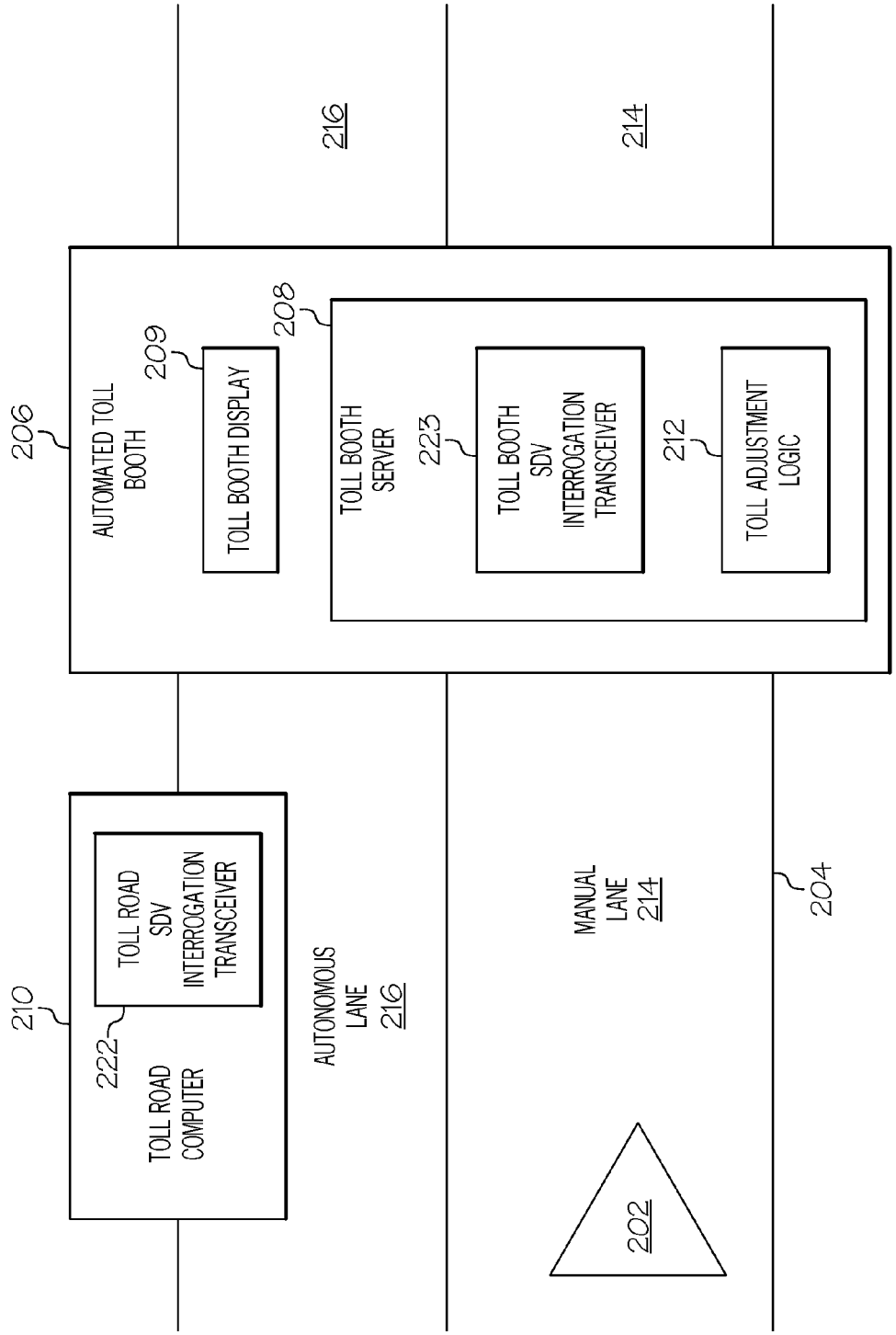
FIG. 2 illustrates an exemplary self-driving vehicle (SDV) approaching an automated toll booth in accordance with one or more embodiments of the present invention.

With reference now to FIG. 2, an exemplary self-driving vehicle (SDV) 202 traveling along a toll road 204 and approaching an automated toll booth 206 in accordance with one or more embodiments of the present invention is presented.

Figure 3:
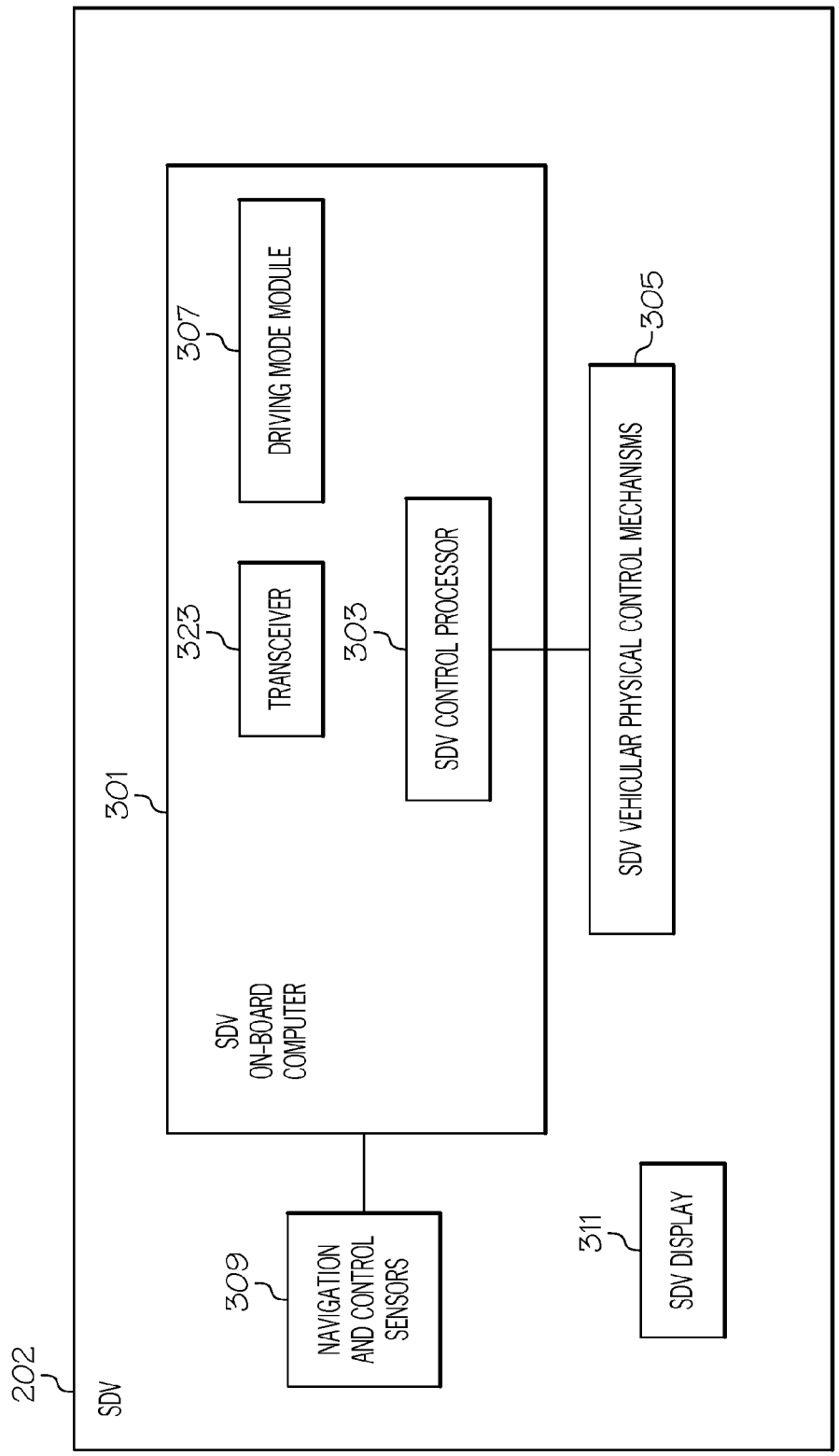
FIG. 3 depicts additional detail of control hardware within an SDV.

Additional detail of one or more embodiments of the SDV 202 is presented in FIG. 3. As shown in FIG. 3, SDV 202 has an SDV on-board computer 301 that controls operations of the SDV 202. According to directives from a driving mode module 307, the SDV 202 can be selectively operated in manual mode or autonomous mode.

While in manual mode, SDV 202 operates as a traditional motor vehicle, in which a human driver controls the engine, steering mechanism, braking system, horn, signals, etc. found on a motor vehicle. These vehicle mechanisms may be operated in a "drive-by-wire" manner, in which inputs to an SDV control processor 303 by the driver result in output signals that control the SDV vehicular physical control mechanisms 305 (e.g., the engine throttle, steering mechanisms, braking systems, turn signals, etc.).

While in autonomous mode, SDV 202 operates without the input of a human driver, such that the engine, steering mechanism, braking system, horn, signals, etc. are controlled by the SDV control processor 303, but now under the control of the SDV on-board computer 301. That is, by processing inputs taken from navigation and control sensors 309 and the driving mode module 307 indicating that the SDV 202 is to be controlled autonomously, then driver inputs are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), air-flow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). By measuring the time it takes to receive back the emitted electromagnetic radiation, and/or evaluating a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

Returning now to FIG. 2, assume that SDV 202 is traveling on toll road 204 when it approaches the automated toll booth 206. Assume further that the present invention treats the SDV 202 differently if it is in autonomous mode or manual mode (described above). Thus, a toll booth SDV interrogation transceiver 223 (analogous to transceiver 123 shown in FIG. 1) and/or a toll road SDV interrogation transceiver 222 (also analogous to transceiver 123 shown in FIG. 1) may interrogate the driving mode module 307 (depicted in FIG. 3) to determine whether the SDV 202 is currently operating in autonomous mode or manual mode.

Assume now that the driving mode module 307 has directed the SDV on-board computer 301 (depicted in FIG. 3) to control the SDV 202 in autonomous mode. This information is then transmitted by the transceiver 323 back to the toll booth SDV interrogation transceiver 223, which relays this information to the toll adjustment logic 212. The toll adjustment logic 212 then sets and/or charges the toll charge for SDV 202 based on whether it is in autonomous mode or manual mode. This adjusted toll charge is then transmitted to the SDV 202 and/or to a coordinating server (e.g., coordinating server 401 shown in FIG. 4), which updates a charge account (e.g., debits a toll pass) for the SDV 202 by the appropriate charge.

In one embodiment of the present invention, the system assumes that SDVs that are operating in autonomous mode deserve a lower toll charge, since historically they move along the toll road in a more efficient manner. That is, SDVs historically may be shown to operate more efficiently since braking, acceleration, etc. is not hampered by driver distractions, moods, etc. Thus, it is financially advantageous to the toll road operator for vehicles to operate in autonomous mode, since more vehicles per hour are able to travel along the toll road. Thus, in this embodiment, the toll adjustment logic 212 will charge the SDV 202 a toll that is lower than that charged to vehicles (including SDV 202) that are operating in manual mode.

Alternatively, the system may assume that SDVs operating in manual mode are more efficient than SDVs operating in autonomous mode. While unusual, this scenario may occur when software and transmission resources are temporarily operating at reduced effectiveness (e.g., during a power outage or a software glitch), thus making vehicles that are in manual mode more efficient when moving along the toll road.

Figure 4:
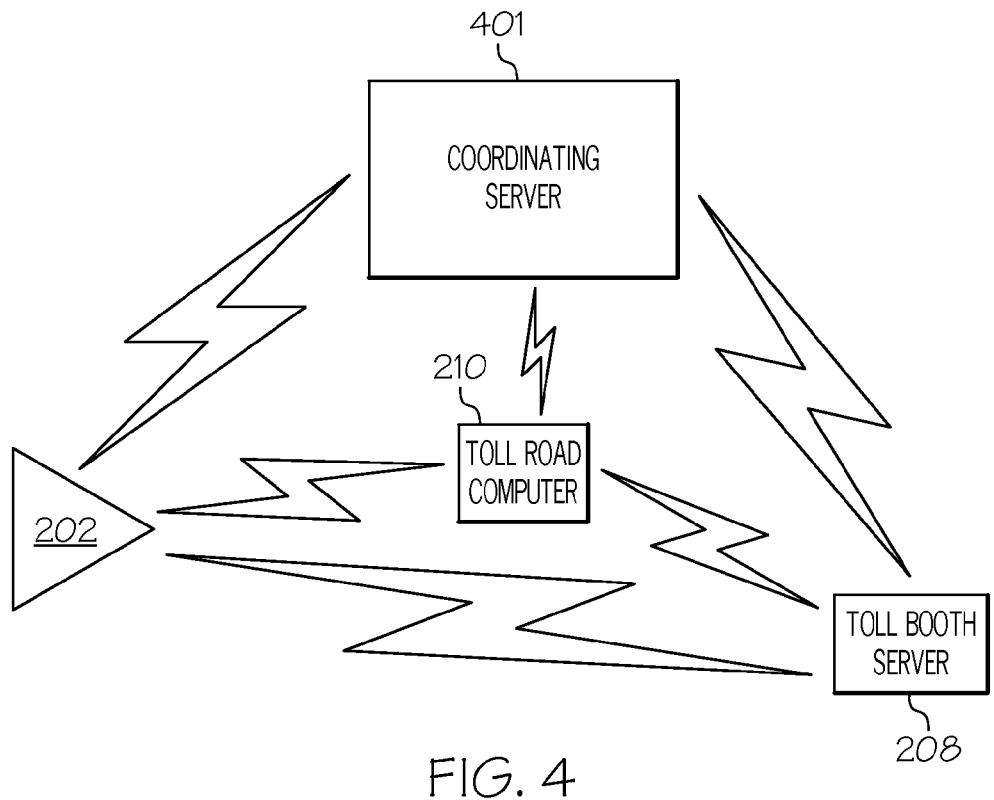
FIG. 4 depicts communication linkages among an SDV, a toll booth server, a toll road computer, and a coordinating server.

With reference now to FIG. 4, communication linkages among the coordinating server 401 (introduced above) and/or the SDV 202 and/or the toll booth server 208 and/or the toll road computer 210 shown in FIG. 2 are presented. That is, in one or more embodiments of the present invention, SDV 206 directly communicates with the toll booth server 208 and/or the toll road computer 210, which then communicate with the coordinating server 401, which may oversee the control and/or toll road billing of the SDV 202. In another embodiment however, the SDV 202 may communicate directly with the coordinating server 401, which then controls the activities of the toll road computer 210 and/or the toll booth server 208.

In one embodiment of the present invention, a weighted voting system is used to weight the various variables used in making the decisions regarding what toll charge to levy against SDVs. Such inputs may include: a history of accidents on a toll road for SDVs in autonomous mode compared to SDVs on the toll road in manual mode, a level of fuel usage/efficiency of SDVs in autonomous mode compared to SDVs on the toll road in manual mode, etc. Such weighted voting approaches may be characterized primarily by three aspects—the inputs (e.g., accident rates, fuel usage), the weights (e.g., weighting accident rates higher than fuel usage levels), and the quota (e.g., how many weighted inputs must be received in order to adjust the toll charge). The inputs are (I1, I2, . . . , IN), where "N" denotes the total number of inputs. An input's weight (w) is the number of "votes" associated with the input to determine how significant (weighted) the input is. A quota (q) is the minimum number of votes required to "pass a motion", which in this case refers to a decision made to adjust the toll charge to the SDV.

In one or more embodiments of the present invention, assessment of a toll charge against SDV 202 depends on a cohort to which a driver of the SDV 202 belongs, and/or a cohort to which the SDV 202 belongs.

For example, assume that a particular driver/occupant of an SDV has a characteristic (e.g., a history of traffic accidents while driving a vehicle in manual mode) found in other members of a cohort of drivers. Assume further that historical data shows that these cohort members have a history of accidents with obstacles on toll roads when auto-control is 1) not activated or 2) not available on the vehicle that the person was driving. As such, the system (e.g., toll adjustment logic 212 in FIG. 2) will automatically charge a driver who is in this cohort more if he/she chooses to operate the SDV 202 in manual, rather than autonomous, mode.

Similarly, assume that SDV 202 has characteristics (e.g., make, model, size, etc.) found in other members of a cohort of SDVs. Assume that this characteristic/trait affects the SDVs ability to respond to emergency situations (such as obstacles in the road) when operating in autonomous mode. Assume further that historical data shows that these cohort members (e.g., particular makes and models of SDVs) have a history of fewer accidents with obstacles on toll roads when auto-control is activated. As such, the system (e.g., toll adjustment logic 212 in FIG. 2) will automatically charge the driver of the SDV 202 a higher toll if he/she chooses to operate the SDV 202 in manual, rather than autonomous, mode.

Figure 5:
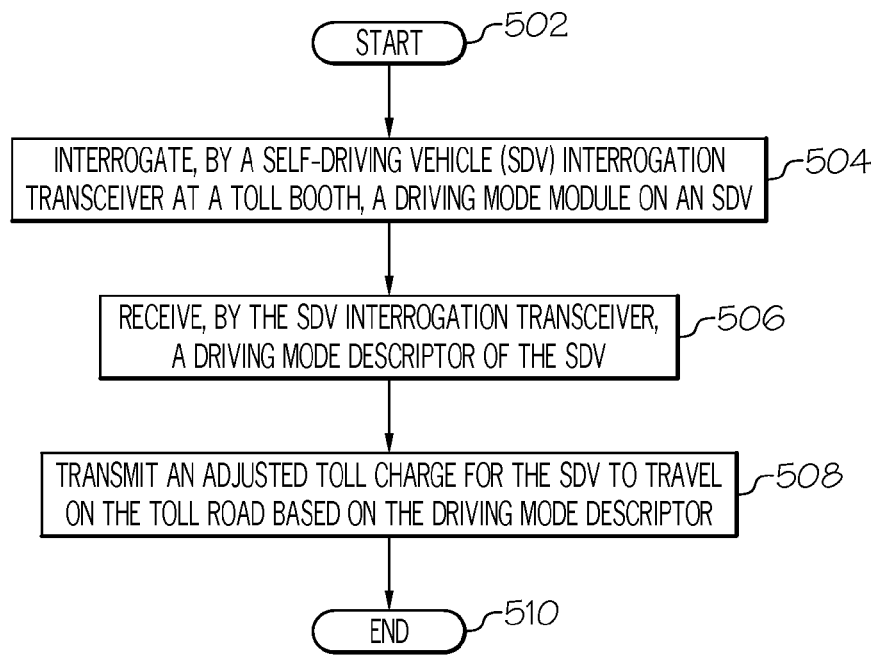
FIG. 5 is a high-level flow chart of one or more steps performed by one or more processors to enable automatic toll booth interaction with SDVs in accordance with one or more embodiments of the present invention.

With reference now to FIG. 5, a high-level flow chart of one or more steps performed by one or more processors to enable automatic toll booth interaction with SDVs in accordance with one or more embodiments of the present invention is presented.

After initiator block 502, a self-driving vehicle (SDV) interrogation transceiver (e.g., toll booth SDV interrogation transceiver 223 and/or toll road SDV interrogation transceiver 222 shown in FIG. 2) at or supportive of a toll booth (e.g., automated toll booth 206) interrogates a driving mode module (e.g., driving mode module 307 shown in FIG. 3) on an SDV (e.g., SDV 202 depicted in the figures), as described in block 504. That is, the driving mode module may be interrogated by an SDV interrogation transceiver that is physically located within the automated toll booth (e.g., toll booth SDV interrogation transceiver 223 in FIG. 2), and/or is part of a toll road computer 210 that supports a toll road SDV interrogation transceiver 222 (see also FIG. 2). As described herein, the SDV is capable of being operated in autonomous mode by an on-board SDV control processor (e.g., SDV control processor 303 shown in FIG. 3). The driving mode module (e.g., driving mode module 307 shown in FIG. 3) selectively controls whether or not the SDV is operated by the SDV control processor 303 in the autonomous mode (e.g., under the control of the SDV control processor 303 shown in FIG. 3) or in manual mode (in which the SDV is controlled by a human driver of the SDV).

As described in block 506 in FIG. 5, the SDV interrogation transceiver (e.g., toll booth SDV interrogation transceiver 223 and/or toll road SDV interrogation transceiver 222 in FIG. 2) then receives a driving mode descriptor of the SDV. This driving mode descriptor (e.g., a message, packet, data file, etc.) identifies whether the SDV currently is operating in the autonomous mode or in the manual mode while traveling on a toll road (e.g., toll road 204 shown in FIG. 2).

As described in block 508 in FIG. 5, one or more processors (e.g., within the toll booth server 208 and/or the toll road computer 210 shown in FIG. 2) then transmit an adjusted toll charge for the SDV to travel on the toll road based on the driving mode descriptor. For example, if the SDV is in autonomous mode, then the adjusted toll charge may be lower than if the SDV is in manual mode. The adjusted toll charge may be transmitted to the SDV 202, to the coordinating server 401 shown in FIG. 4 (for management of the toll account for SDV 202), or to another entity chosen by the user/system.

The flow-chart of FIG. 5 ends at terminator block 510.

In an embodiment of the present invention, the adjusted toll charge is for SDVs operating in the autonomous mode. In this embodiment, the SDV interrogation transceiver detects that the SDV is in the autonomous mode while passing the toll booth and is being charged the adjusted toll charge for SDVs operating in the autonomous mode. In response to detecting that the SDV has been charged the adjusted toll charge for SDVs operating in the autonomous mode, a transmitter (e.g., part of the toll road SDV interrogation transceiver 222 and/or the toll booth SDV interrogation transceiver 223 shown in FIG. 2) then transmits a signal to the on-board SDV control processor that blocks an attempt to operate the SDV in the manual mode while on the toll road. That is, if the driver of the SDV 202 only turns on the autonomous mode of the SDV while passing through the toll booth (in order to get the cheaper toll), and then attempts to turn back on the manual mode for the SDV after passing through the toll booth, then an SDV interrogation transceiver (e.g., toll road SDV interrogation transceiver 222 or toll booth SDV interrogation transceiver 223 in FIG. 2) will prevent this ruse by locking the SDV into autonomous mode after it passes through the toll booth while in the autonomous mode (and paid the lower toll).

In an embodiment of the present invention, an SDV interrogation transceiver on the toll road (e.g., toll road SDV interrogation transceiver 222 in FIG. 2) detects that the SDV is in the autonomous mode. In response to detecting that the SDV is in the autonomous mode, a transmitter (e.g., part of the toll road SDV interrogation transceiver 222 and/or the toll booth SDV interrogation transceiver 223 shown in FIG. 2) transmits a signal to the on-board SDV control processor to autonomously drive the SDV to a lane on the toll road that is reserved for SDV vehicles operating in the autonomous mode.

For example, assume in FIG. 2 that SDV 202 is traveling on toll road 204 on a lane that is reserved for SDVs traveling in manual mode (e.g., manual lane 214). However, SDV 202 is actually traveling in autonomous mode. Assume further that autonomous lane 216 is reserved for SDVs traveling in autonomous mode. As such, the toll road interrogation transceiver 222 and/or the toll booth SDV interrogation transceiver 223 will detect that the SDV 202 should be driving in autonomous lane 216, and will transmit directions to the on-board SDV control processor (e.g., SDV control processor 303 in FIG. 3) to autonomously steer the SDV 202 onto autonomous lane 216.

In an embodiment of the present invention, an SDV interrogation transceiver on the toll road (e.g., toll road interrogation transceiver 222 and/or the toll booth SDV interrogation transceiver 223 shown in FIG. 2) detects that the SDV is in manual mode. In response to detecting that the SDV is in the manual mode, a transmitter (e.g., a component of the toll road interrogation transceiver 222 and/or the toll booth SDV interrogation transceiver 223 shown in FIG. 2) transmits a signal to the on-board SDV control processor to put the SDV into the autonomous mode and to autonomously drive the SDV to a lane that is reserved for SDV vehicles operating in the manual mode. Thereafter, the SDV is permitted to revert to manual mode upon reaching the lane that is reserved for SDV vehicles operating in the manual mode.

For example, assume now that the SDV 202 shown in FIG. 2 is in manual mode but is actually traveling on a lane that is reserved for vehicles in autonomous mode (e.g., autonomous lane 216). As such, a transmitter component of the toll road interrogation transceiver 222 and/or the toll booth SDV interrogation transceiver 223 shown in FIG. 2 will then send a signal to the on-board SDV control processor 303 within the SDV 202, causing the SDV 202 to move off the autonomous lane 216 (which is reserved for SDVs in autonomous mode) and onto manual lane 214 (which is reserved for SDVs in manual mode). However, in order to force the SDV 202 onto manual lane 214, the SDV control processor 303 must initially be engaged in autonomous mode. Once the SDV 202 is driving on manual lane 214 (which is reserved for manual mode SDVs), then the SDV control processor allows the SDV on-board computer 301 to revert back to manual mode, allowing the driver to again take control of the SDV 202.

In an embodiment of the present invention, the SDV interrogation transceiver at or near the toll booth (e.g., toll road interrogation transceiver 222 and/or the toll booth SDV interrogation transceiver 223 shown in FIG. 2) detects that the SDV is in the manual mode while approaching the toll booth. In response to detecting that the SDV is in the manual mode while approaching the toll booth, a transmitter (e.g., a transmitter component of toll road interrogation transceiver 222 and/or the toll booth SDV interrogation transceiver 223 shown in FIG. 2) transmits a first signal to the on-board SDV control processor to autonomously drive the SDV through the toll booth. In response to determining, by the SDV interrogation transceiver, that the SDV has passed through the toll booth, the transmitter (e.g., a transmitter component of toll road interrogation transceiver 222 and/or the toll booth SDV interrogation transceiver 223 shown in FIG. 2) then transmits a second signal to the on-board SDV control processor to revert the SDV to the manual mode.

Thus, in this embodiment, the driver of the SDV tacitly acknowledges that he/she owes the manual mode toll rate. However, for safety purposes, the toll road/booth computers will take control of the SDV while it passes through the toll booth, thus avoiding accidents, unnecessary slow-downs, etc.

In an embodiment of the present invention, an SDV interrogation transceiver on the toll road (e.g., a transmitter component of toll road interrogation transceiver 222 and/or the toll booth SDV interrogation transceiver 223 shown in FIG. 2) detects that the SDV is operating in the manual mode while traveling on an autonomous mode lane that is reserved for SDVs that are operating in the autonomous mode. In response to detecting that the SDV is operating in the manual mode while traveling on the autonomous mode lane that is reserved for SDVs that are operating in the autonomous mode, a transmitter (e.g., a transmitter component of toll road interrogation transceiver 222 and/or the toll booth SDV interrogation transceiver 223 shown in FIG. 2) transmits a signal to the on-board SDV control processor to put the SDV into the autonomous mode. That is, if the SDV is traveling on autonomous lane 216 while in manual mode, then a signal is sent to the SDV putting it into autonomous mode.

In an embodiment of the present invention, one or more processors (e.g., part of toll booth server 208) retrieve traffic pattern data for multiple SDVs traveling on the toll road. The processors examine the traffic pattern data to determine characteristics of a first traffic flow of the multiple SDVs and a second traffic flow of the multiple SDVs. The multiple SDVs in the first traffic flow are operating in the autonomous mode on the toll road, and the multiple SDVs in the second traffic flow are operating in the manual mode on the toll road. In response to determining that the first traffic flow is more efficient than the second traffic flow, the processors then reduce the toll charge for the SDV in response to determining that the SDV is operating in the autonomous mode.

For example, assume that traffic patterns of SDVs are examined according to whether the SDVs are in autonomous mode or manual mode. In one embodiment, the SDVs are segregated into autonomous lane 216 (assuming that SDVs traveling on autonomous lane 216 are doing so in autonomous mode) and manual lane 214 (assuming that SDVs traveling on manual lane 214 are doing so in manual mode). In another embodiment, however, there are no dedicated lanes for SDVs in autonomous mode or manual mode. In either embodiment, if an examination of the traffic patterns for SDVs in autonomous/manual mode reveals that vehicles operating in autonomous mode are safer, move with less congestion, are faster, etc., then the toll charge for vehicles operating in autonomous mode is reduced compared to the toll charge for vehicles operating in manual mode.

However, if an examination of the traffic patterns for SDVs in autonomous/manual mode reveals that vehicles operating in manual mode are safer, move with less congestion, are faster, etc., then the toll charge for vehicles operating in manual mode is reduced compared to the toll charge for vehicles operating in autonomous mode. This second scenario is less likely, but may still occur based on unusual weather patterns (in which manual mode is safer due to road conditions), idiosyncrasies of the SDVs (which may have autonomous modes that are unstable for certain weather conditions, times of days, speeds, etc.), etc.

In an embodiment of the present invention, one or more processors (e.g., components of toll road computer 210 and/or toll booth server 208 in FIG. 2 and/or coordinating server 401 in FIG. 4) retrieve driver profile information about a driver of the SDV. This driver is then assigned, by the one or more processors, to a cohort of drivers traveling on the toll road in multiple SDVs, where the driver of the SDV shares more than a predetermined quantity of traits with members of the cohort of drivers. The one or more processors retrieve traffic pattern data for the multiple SDVs occupied by the cohort of drivers traveling on the toll road. The one or more processors then examine the traffic pattern data to determine a first traffic flow and a second traffic flow. The first traffic flow is of SDVs that are occupied by members of the cohort of drivers while the SDVs are operating in autonomous mode on the toll road, and the second traffic flow is of SDVs that are occupied by members of the cohort of drivers while the SDVs are operating in manual mode on the toll road. In response to determining that the first traffic flow is more efficient than the second traffic flow, then one or more processors reduce the toll charge for the SDV in response to determining that the SDV is operating in the autonomous mode.

That is, assume that a cohort of drivers is made up of drivers who are not very good drivers (e.g., have many accidents, drive too slowly, cause traffic congestion, etc.). Such drivers are encouraged to let the SDV drive itself (in autonomous mode) by giving the SDV a reduced toll charge. However, another cohort of drivers may be made up of excellent drivers, who are able to out-perform the on-board SDV control processor. If a particular driver fits into this cohort, then he/she is charged less if he/she is in control of the SDV rather than the on-board SDV control processor.

The determination of whether a particular cohort of drivers (and thus each member thereof) is better than or worse than the on-board SDV control processor at controlling the SDV is history-based. That is, the processors examine the driving history of "poor" drivers and "excellent" drivers while their occupied SDV is in both manual mode and autonomous mode. "Poor" drivers are those who are unable to operate the SDV as well as the on-board SDV control processor, and "excellent" drivers are those who are able to operate the SDV better than the on-board SDV control processor.

In an embodiment of the present invention, one or more processors (e.g., components of toll road computer 210 and/or toll booth server 208 in FIG. 2 and/or coordinating server 401 in FIG. 4) further adjust the toll charge based on a size and weight of the SDV combined with the driving mode descriptor. For example, large vehicles (e.g., tractor-trailer rigs) may be given a greater toll reduction than smaller vehicles (e.g., passenger cars). That is, a determination may be made that it is more advantageous for large vehicles to operate in autonomous mode (such that a 20% toll charge discount is awarded for operating tractor-trailer rigs in autonomous mode), while it is less important for smaller vehicles to operate in autonomous mode (such that a 10% toll charge discount is awarded to cars for operating in autonomous mode). Alternatively, a determination may be made that it is more advantageous for smaller vehicles to operate in autonomous mode (such that a 20% toll charge discount is awarded for operating to cars in autonomous mode), while it is less important for larger vehicles to operate in autonomous mode (such that a 10% toll charge discount is awarded to tractor-trailer rigs for operating in autonomous mode).

In an embodiment of the present invention, the adjusted toll charge is displayed on a display. In one embodiment, the display is on the toll booth (e.g., toll booth display 209 shown in FIG. 2), such that the display shows the adjusted toll charge as the SDV passes through the toll booth. In one embodiment, the display is within the SDV (e.g., SDV display 3112 shown in FIG. 3), such that the adjusted toll charge is shown only to the occupants of the SDV 202.

Thus, in one embodiment, the adjusted toll charge is presented on a public display at the toll booth, while in another (or additional) embodiment, the adjusted toll charge is presented on a screen within the SDV.

In one embodiment of the present invention, the toll booth SDV interrogation transceiver 223 shown in FIG. 2 interrogates the SDV 202 to determine what speed the SDV 202 has been traveling in the past or desires to travel in the future on the toll road 204. That is, assume that one lane (e.g., lane 216) is reserved for vehicles that want to go up to 80 miles per hour, while lane 214 is reserved for vehicle that want to go no faster than 65 miles per hour. The toll booth SDV interrogation transceiver 223 receives a signal from the SDV on-board computer 301 indicating the speed preference of the occupant/driver of the SDV 202, and adjusts the toll accordingly (e.g., charging the SDV 202 more to travel in the fast lane as opposed to driving in the slower lane).

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
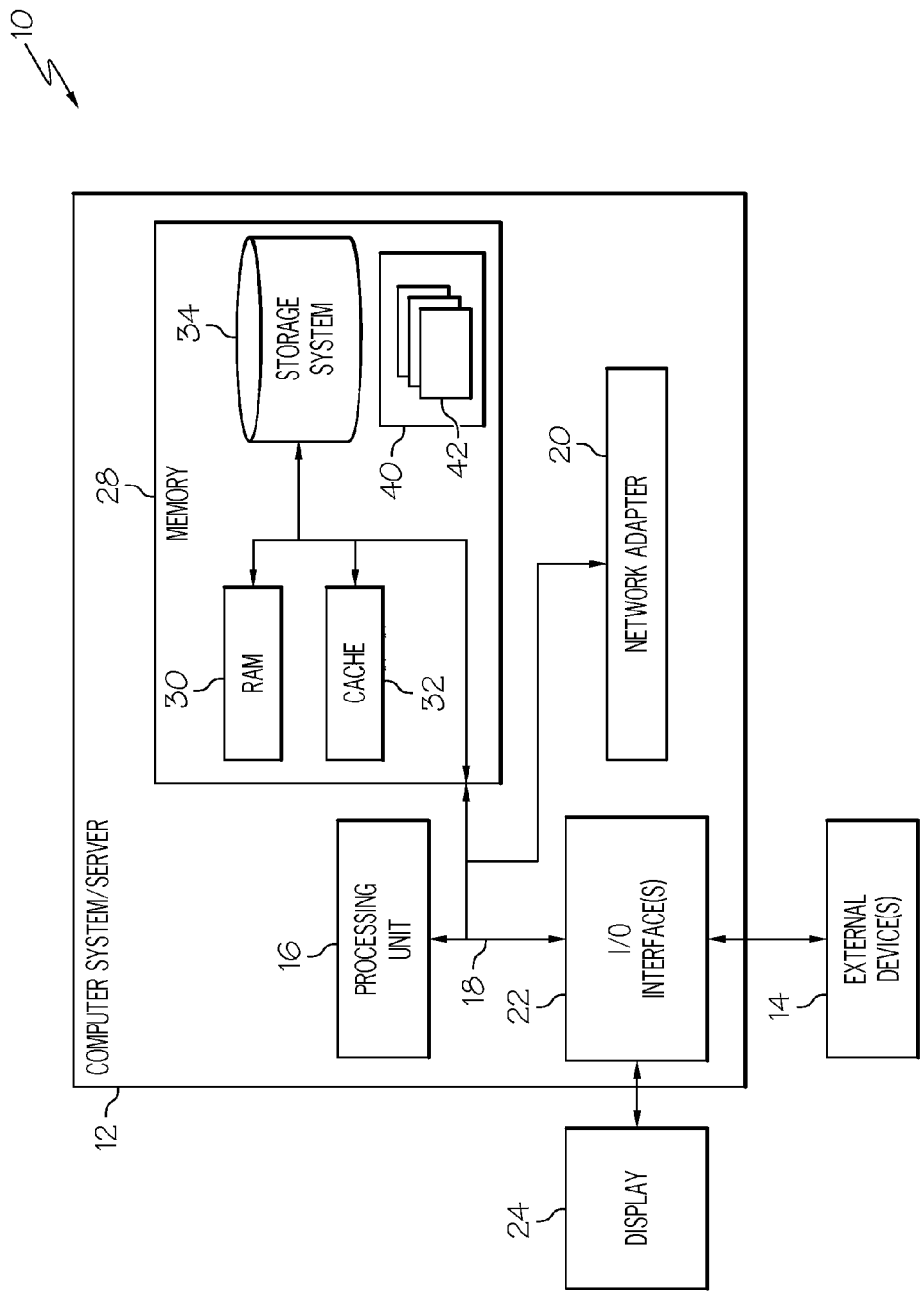
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
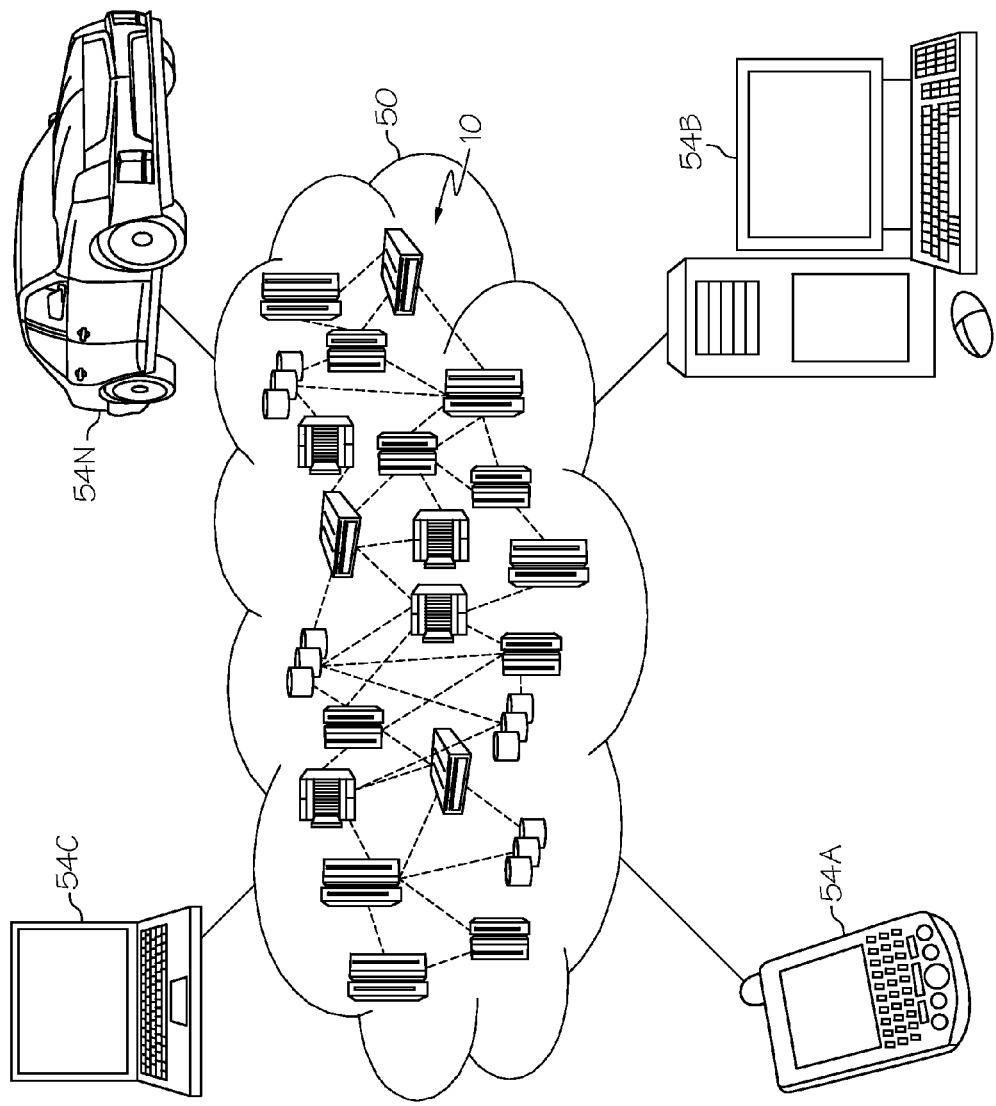
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
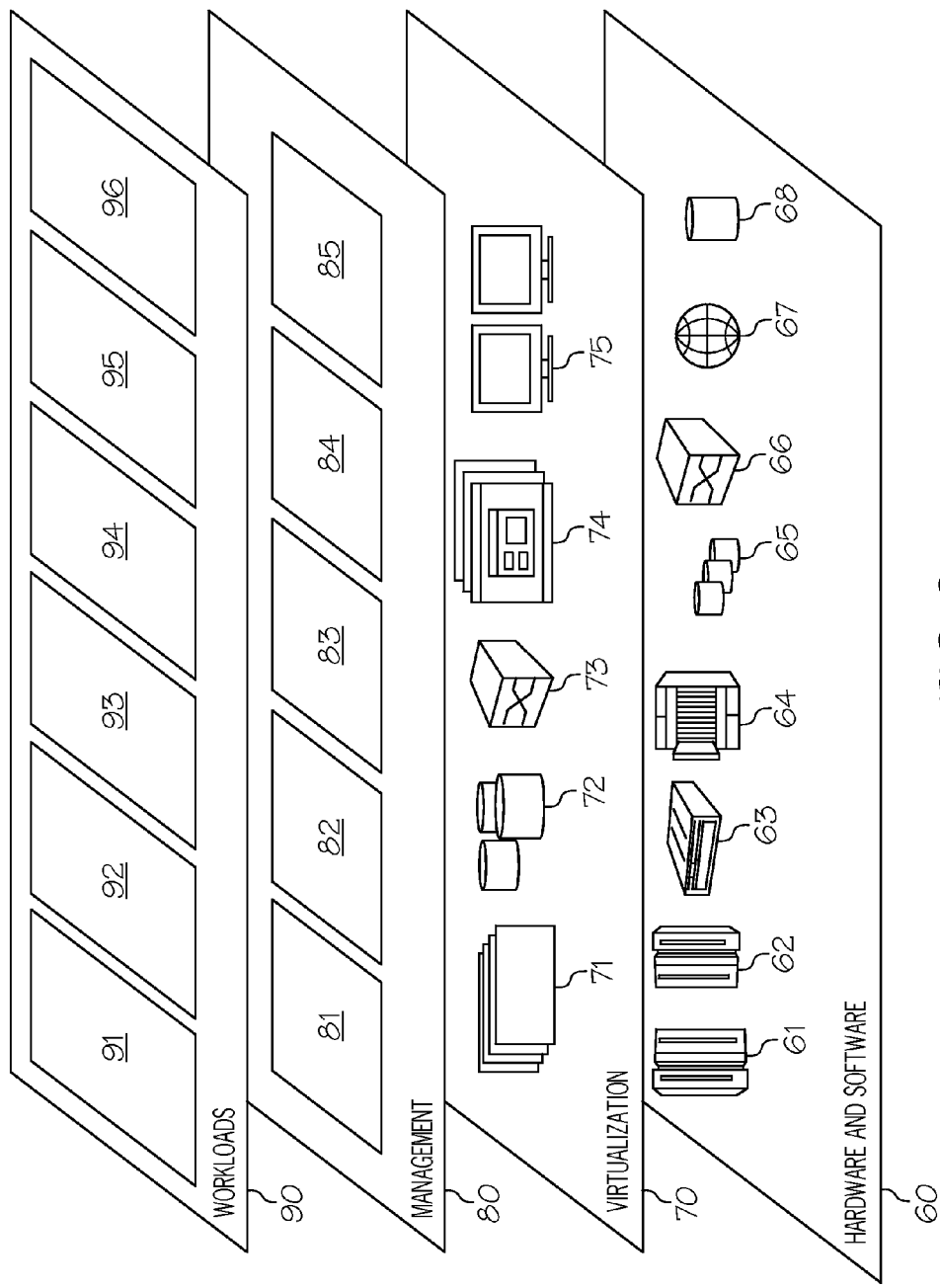
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96 (for controlling and setting toll rates for SDVs as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for automatic toll booth interaction with self-driving vehicles (SDVs), the computer-implemented method comprising:

interrogating, by a self-driving vehicle (SDV) interrogation transceiver at a toll booth, a driving mode module on an SDV, wherein the SDV is capable of being operated in autonomous mode by an on-board SDV control processor, wherein the driving mode module selectively controls the SDV to be operated in the autonomous mode or in manual mode, and wherein the SDV is controlled by a human driver of the SDV if in the manual mode;

receiving, by the SDV interrogation transceiver, a driving mode descriptor of the SDV, wherein the driving mode descriptor identifies whether the SDV currently is operating in the autonomous mode or in the manual mode while traveling on a toll road;

transmitting, by one or more processors, an adjusted toll charge for the SDV to travel on the toll road based on the driving mode descriptor, wherein the adjusted toll charge is for SDVs operating in the autonomous mode;

detecting, by the SDV interrogation transceiver, that the SDV is in the autonomous mode while passing the toll booth and is being charged the adjusted toll charge for SDVs operating in the autonomous mode; and in response to detecting that the SDV has been charged the adjusted toll charge for SDVs operating in the autonomous mode, transmitting a signal to the on-board SDV control processor that blocks an attempt to operate the SDV in the manual mode while on the toll road.

2. The computer-implemented method of claim 1, further comprising:

detecting, by an SDV interrogation transceiver on the toll road, that the SDV is in the autonomous mode; and in response to detecting that the SDV is in the autonomous mode, transmitting a signal to on-board SDV control processor to autonomously drive the SDV to a lane on the toll road that is reserved for SDV vehicles operating in the autonomous mode.

3. The computer-implemented method of claim 1, further comprising:

detecting, by an SDV interrogation transceiver on the toll road, that the SDV is in the manual mode; and in response to detecting that the SDV is in the manual mode, transmitting a signal to the on-board SDV control processor to put the SDV into the autonomous mode and to autonomously drive the SDV to a lane that is reserved for SDV vehicles operating in the manual mode, wherein the SDV is permitted to revert to manual mode upon reaching the lane that is reserved for SDV vehicles operating in the manual mode.

4. The computer-implemented method of claim 1, further comprising:

detecting, by the SDV interrogation transceiver at the toll booth, that the SDV is in the manual mode while approaching the toll booth;

in response to detecting that the SDV is in the manual mode while approaching the toll booth, transmitting a first signal to the on-board SDV control processor to autonomously drive the SDV through the toll booth; and in response to determining, by the SDV interrogation transceiver, that the SDV has passed through the toll booth, transmitting a second signal to the on-board SDV control processor to revert the SDV to the manual mode.

5. The computer-implemented method of claim 1, further comprising:

detecting, by an SDV interrogation transceiver on the toll road, that the SDV is operating in the manual mode while traveling on an autonomous mode lane that is reserved for SDVs that are operating in the autonomous mode; and in response to detecting that the SDV is operating in the manual mode while traveling on the autonomous mode lane that is reserved for SDVs that are operating in the autonomous mode, transmitting a signal to the on-board SDV control processor to put the SDV into the autonomous mode.

6. The computer-implemented method of claim 1, further comprising:
   retrieving, by one or more processors, traffic pattern data for multiple SDVs traveling on the toll road;
   examining, by one or more processors, the traffic pattern data to determine characteristics of a first traffic flow of the multiple SDVs, wherein the multiple SDVs in the first traffic flow are operating in the autonomous mode on the toll road;
   examining, by one or more processors, the traffic pattern data to determine characteristics of a second traffic flow of the multiple SDVs, wherein the multiple SDVs in the second traffic flow are operating in the manual mode on the toll road; and
   in response to determining that the first traffic flow is more efficient than the second traffic flow, reducing, by one or more processors, the toll charge for the SDV in response to determining that the SDV is operating in the autonomous mode.

7. The computer-implemented method of claim 1, further comprising:
   retrieving, by one or more processors, traffic pattern data for multiple SDVs traveling on the toll road;
   examining, by one or more processors, the traffic pattern data to determine characteristics of a first traffic flow of the multiple SDVs, wherein the multiple SDVs in the first traffic flow are operating in the autonomous mode on the toll road;
   examining, by one or more processors, the traffic pattern data to determine characteristics of a second traffic flow of the multiple SDVs, wherein the multiple SDVs in the second traffic flow are operating in the manual mode on the toll road; and
   in response to determining that the second traffic flow is more efficient than the first traffic flow, reducing, by one or more processors, the toll charge for the SDV in response to determining that the SDV is operating in the manual mode.

8. The computer-implemented method of claim 1, further comprising:
   retrieving, by one or more processors, driver profile information about a driver of the SDV;
   assigning, by one or more processors, the driver of the SDV to a cohort of drivers traveling on the toll road in multiple SDVs, wherein the driver of the SDV shares more than a predetermined quantity of traits with members of the cohort of drivers;
   retrieving, by one or more processors, traffic pattern data for the multiple SDVs occupied by the cohort of drivers traveling on the toll road;
   examining, by one or more processors, the traffic pattern data to determine a first traffic flow of the multiple SDVs occupied by members of the cohort of drivers, wherein the multiple SDVs in the first traffic flow are operating in the autonomous mode on the toll road;
   examining, by one or more processors, the traffic pattern data to determine a second traffic flow of the multiple SDVs occupied by members of the cohort of drivers, wherein the multiple SDVs in the second traffic flow are operating in the manual mode on the toll road; and
   in response to determining that the first traffic flow is more efficient than the second traffic flow, reducing, by one or more processors, the toll charge for the SDV in response to determining that the SDV is operating in the autonomous mode.

9. The computer-implemented method of claim 1, further comprising:
   retrieving, by one or more processors, driver profile information about a driver of the SDV;
   assigning, by one or more processors, the driver of the SDV to a cohort of drivers traveling on the toll road in multiple SDVs, wherein the driver of the SDV shares more than a predetermined quantity of traits with members of the cohort of drivers;
   retrieving, by one or more processors, traffic pattern data for the multiple SDVs occupied by the cohort of drivers traveling on the toll road;
   examining, by one or more processors, the traffic pattern data to determine a first traffic flow of the multiple SDVs occupied by members of the cohort of drivers, wherein the multiple SDVs in the first traffic flow are operating in the autonomous mode on the toll road;
   examining, by one or more processors, the traffic pattern data to determine a second traffic flow of the multiple SDVs occupied by members of the cohort of drivers, wherein the multiple SDVs in the second traffic flow are operating in the manual mode on the toll road; and
   in response to determining that the second traffic flow is more efficient than the first traffic flow, reducing, by one or more processors, the toll charge for the SDV in response to determining that the SDV is operating in the manual mode.

10. The computer-implemented method of claim 1, further comprising:
    further adjusting, by one or more processors, the toll charge based on a size and weight of the SDV combined with the driving mode descriptor.

11. The computer-implemented method of claim 1, further comprising:
    displaying, on a display, the adjusted toll charge for the SDV.

12. The computer-implemented method of claim 11, wherein the display is on the toll booth.

13. The computer-implemented method of claim 11, wherein the display is in the SDV.

14. A computer program product for automatic toll booth interaction with self-driving vehicles (SDVs), the computer program product comprising a non-transitory computer readable storage medium having program code embodied therewith, the program code readable and executable by a processor to perform a method comprising:
    interrogating, by a self-driving vehicle (SDV) interrogation transceiver at a toll booth, a driving mode module on an SDV, wherein the SDV is capable of being operated in autonomous mode by an on-board SDV control processor, wherein the driving mode module selectively controls the SDV to be operated in the autonomous mode or in manual mode, and wherein the SDV is controlled by a human driver of the SDV if in the manual mode;
    receiving, by the SDV interrogation transceiver, a driving mode descriptor of the SDV, wherein the driving mode descriptor identifies whether the SDV currently is operating in the autonomous mode or in the manual mode while traveling on a toll road;
    transmitting, by one or more processors, an adjusted toll charge for the SDV to travel on the toll road based on the driving mode descriptor, wherein the adjusted toll charge is for SDVs operating in the autonomous mode;

detecting, by the SDV interrogation transceiver, that the SDV is in the autonomous mode while passing the toll booth and is being charged the adjusted toll charge for SDVs operating in the autonomous mode; and in response to detecting that the SDV has been charged the adjusted toll charge for SDVs operating in the autonomous mode, transmitting a signal to the on-board SDV control processor that blocks an attempt to operate the SDV in the manual mode while on the toll road.

15. The computer program product of claim 14, wherein the method further comprises:

detecting, by an SDV interrogation transceiver on the toll road, that the SDV is in the autonomous mode; and in response to detecting that the SDV is in the autonomous mode, transmitting a signal to on-board SDV control processor to autonomously drive the SDV to a lane on the toll road that is reserved for SDV vehicles operating in the autonomous mode.

16. A computer system comprising:

a processor, a computer readable memory, and a non-transitory computer readable storage medium;

first program instructions to interrogate, by a self-driving vehicle (SDV) interrogation transceiver at a toll booth, a driving mode module on an SDV, wherein the SDV is capable of being operated in autonomous mode by an on-board SDV control processor, wherein the driving mode module selectively controls the SDV to be operated in the autonomous mode or in manual mode, and wherein the SDV is controlled by a human driver of the SDV if in the manual mode;

second program instructions to receive a driving mode descriptor of the SDV, wherein the driving mode descriptor identifies whether the SDV currently is operating in the autonomous mode or in the manual mode while traveling on a toll road;

third program instructions to transmit an adjusted toll charge for the SDV to travel on the toll road based on the driving mode descriptor, wherein the adjusted toll charge is for SDVs operating in the autonomous mode;

fourth program instructions to detect, by the SDV interrogation transceiver, that the SDV is in the autonomous mode while passing the toll booth and is being charged the adjusted toll charge for SDVs operating in the autonomous mode; and fifth program instructions to, in response to detecting that the SDV has been charged the adjusted toll charge for SDVs operating in the autonomous mode, transmit a signal to the on-board SDV control processor that blocks an attempt to operate the SDV in the manual mode while on the toll road; and wherein the first, second, third, fourth and fifth program instructions are stored on the non-transitory computer readable storage medium for execution by one or more processors via the computer readable memory.

17. The computer system of claim 16, further comprising:

sixth program instructions to detect that the SDV is in the autonomous mode; and seventh program instructions to, in response to detecting that the SDV is in the autonomous mode, transmit a signal to on-board SDV control processor to autonomously drive the SDV to a lane on the toll road that is reserved for SDV vehicles operating in the autonomous mode; and wherein the sixth and seventh program instructions are stored on the non-transitory computer readable storage medium for execution by one or more processors via the computer readable memory.

* * * * *